United States Patent
Lackner et al.

(10) Patent No.: US 12,303,824 B2
(45) Date of Patent: May 20, 2025

(54) MOVING SORBENT PANEL SYSTEM FOR CAPTURING ATMOSPHERIC CARBON DIOXIDE

(71) Applicants: Klaus Lackner, Paradise Valley, AZ (US); Robert Page, Phoenix, AZ (US)

(72) Inventors: Klaus Lackner, Paradise Valley, AZ (US); Robert Page, Phoenix, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 434 days.

(21) Appl. No.: 17/738,994

(22) Filed: May 6, 2022

(65) Prior Publication Data

US 2022/0355238 A1 Nov. 10, 2022

Related U.S. Application Data

(60) Provisional application No. 63/185,956, filed on May 7, 2021.

(51) Int. Cl.
*B01D 53/04* (2006.01)
*B01D 53/06* (2006.01)

(52) U.S. Cl.
CPC .......... *B01D 53/06* (2013.01); *B01D 2253/34* (2013.01); *B01D 2257/504* (2013.01); *B01D 2259/40086* (2013.01)

(58) Field of Classification Search
CPC .. B01D 53/06; B01D 53/08; B01D 2252/204; B01D 2253/104; B01D 2253/106;
(Continued)

(56) References Cited

U.S. PATENT DOCUMENTS 7,026,723 B2 * 4/2006 Moreno ................. F03B 13/00
290/55
7,821,151 B2 * 10/2010 Le ............................ F03D 9/25
290/43
(Continued)

OTHER PUBLICATIONS

Lackner, Klaus S., "The thermodynamics of direct air capture of carbon dioxide", Energy, 50:38-46 (2013).
(Continued)

*Primary Examiner* — Minh Chau T Pham
(74) *Attorney, Agent, or Firm* — FULLER IP LAW LLC; Rodney J. Fuller

(57) ABSTRACT

A system for capturing atmospheric carbon dioxide is disclosed, including a track and a plurality of panels moveably coupled to the track, each panel having a sorbent material. The system also includes a harvest house having a sorbent regeneration system and at least one aperture, and a propulsion system coupled to the track and configured to move each panel in a circuit having a collection phase and a release phase. For each panel, the collection phase of the circuit includes the panel moving along the track to expose the sorbent material to an airflow and allow the sorbent material to capture carbon dioxide. For each panel, the release phase of the circuit includes the panel being sufficiently enclosed inside the harvest house that the sorbent regeneration system may operate on the sorbent material to release captured carbon dioxide from the sorbent material and form an enriched gas.

18 Claims, 11 Drawing Sheets

(58) Field of Classification Search
CPC .......... B01D 2253/25; B01D 2253/202; B01D 2257/504; B01D 2259/4009
USPC .............................. 95/107, 139; 96/125, 146
See application file for complete search history.

(56) References Cited

U.S. PATENT DOCUMENTS

| | | | |
|---|---|---|---|
| 10,337,504 B1* | 7/2019 | Al-Sulaiman | F24S 23/31 |
| 2015/0007725 A1* | 1/2015 | Elliott | B01D 53/83 |
| | | | 96/125 |
| 2015/0007726 A1* | 1/2015 | Elliott | B01D 53/0446 |
| | | | 95/139 |
| 2015/0007727 A1* | 1/2015 | Elliott | B01D 53/04 |
| | | | 95/139 |
| 2015/0273385 A1* | 10/2015 | Eisenberger | B01D 53/08 |
| | | | 95/107 |
| 2023/0119882 A1* | 4/2023 | Lackner | B01D 53/06 |
| | | | 96/125 |
| 2023/0277976 A1* | 9/2023 | Lackner | F24S 20/30 |
| | | | 96/146 |

OTHER PUBLICATIONS

Lackner, Klaus S., "Washing Carbon Out of the Air", Scientific American, pp. 66-71 (Jun. 2010).

\* cited by examiner

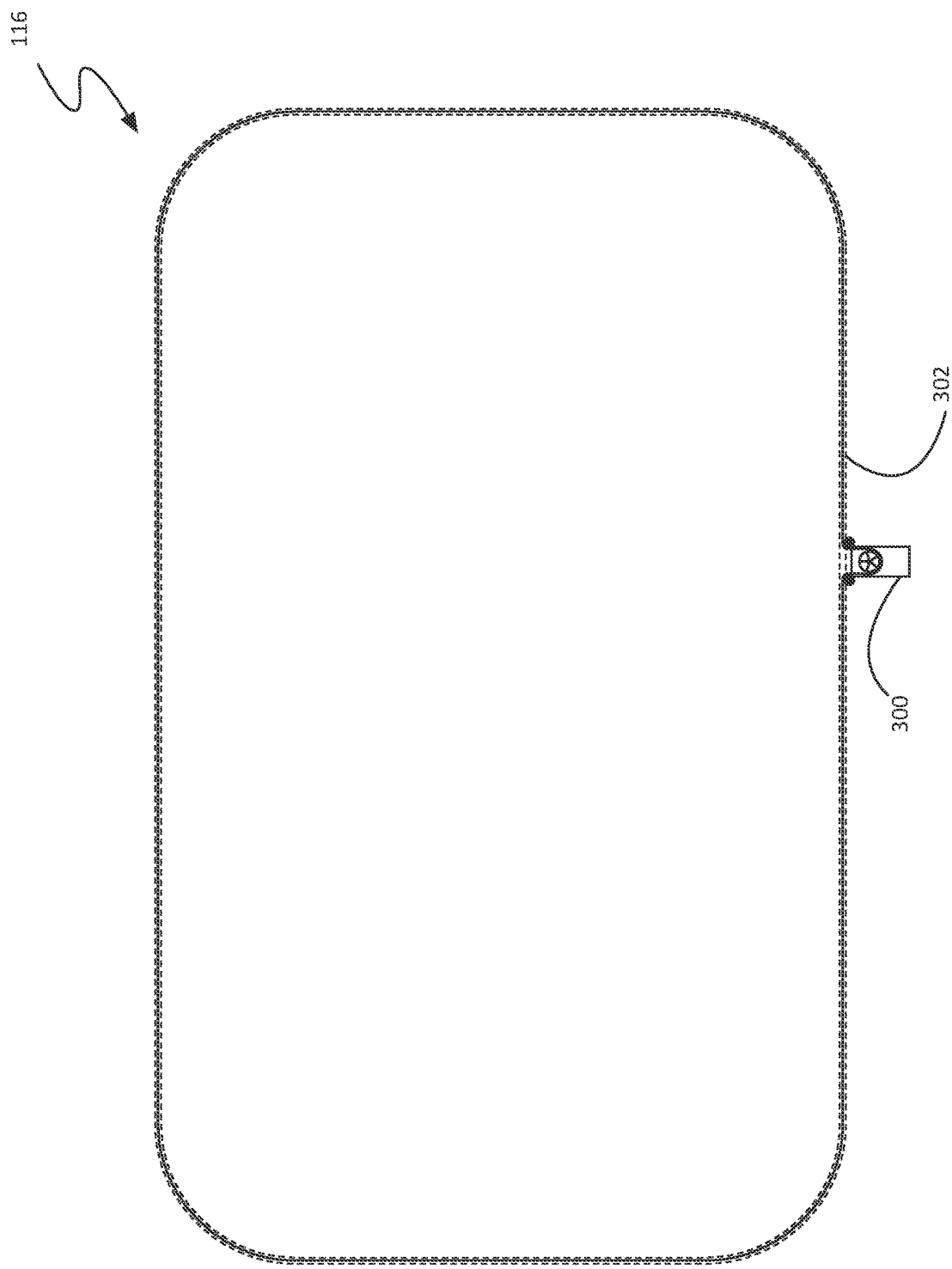

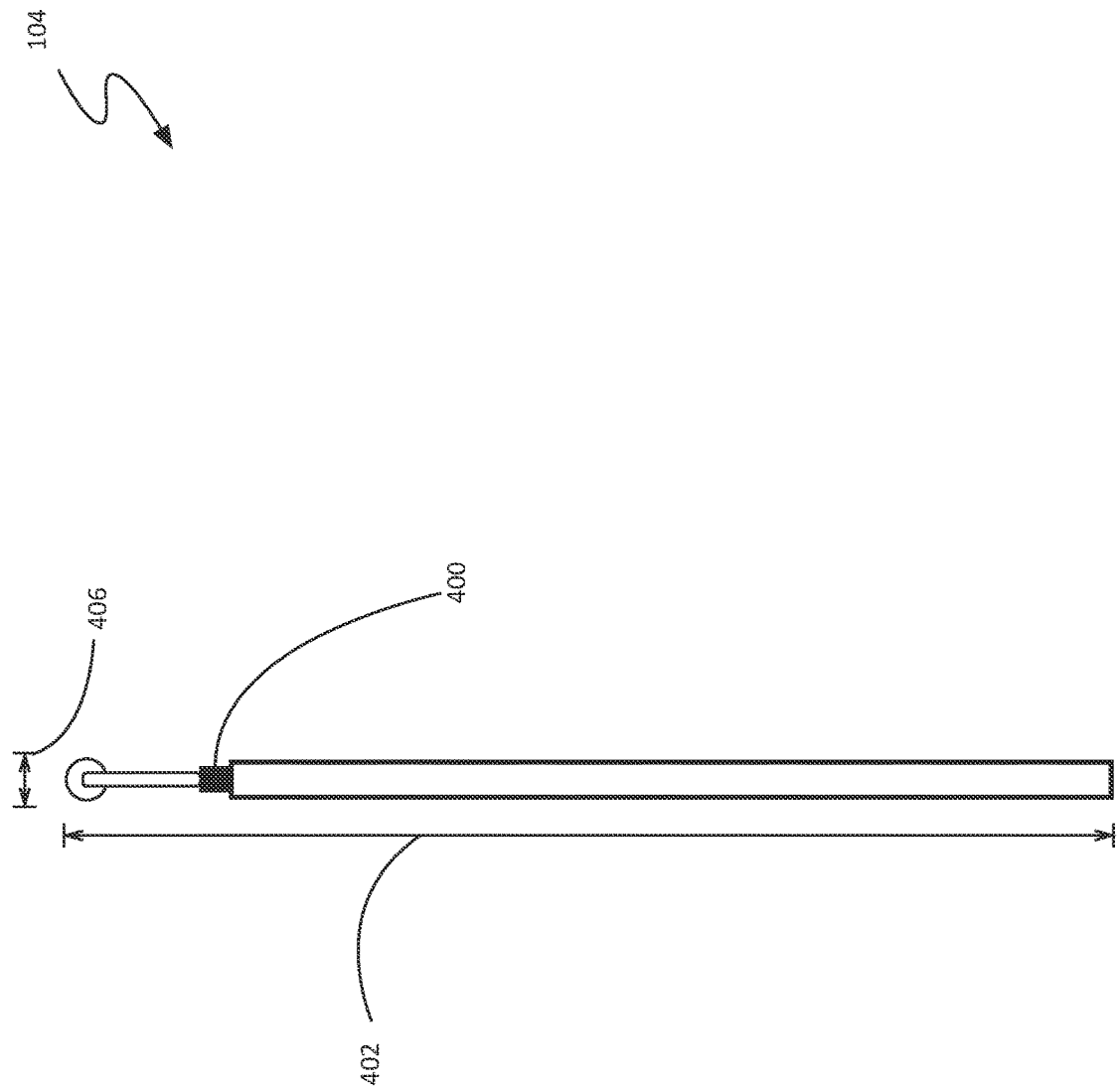

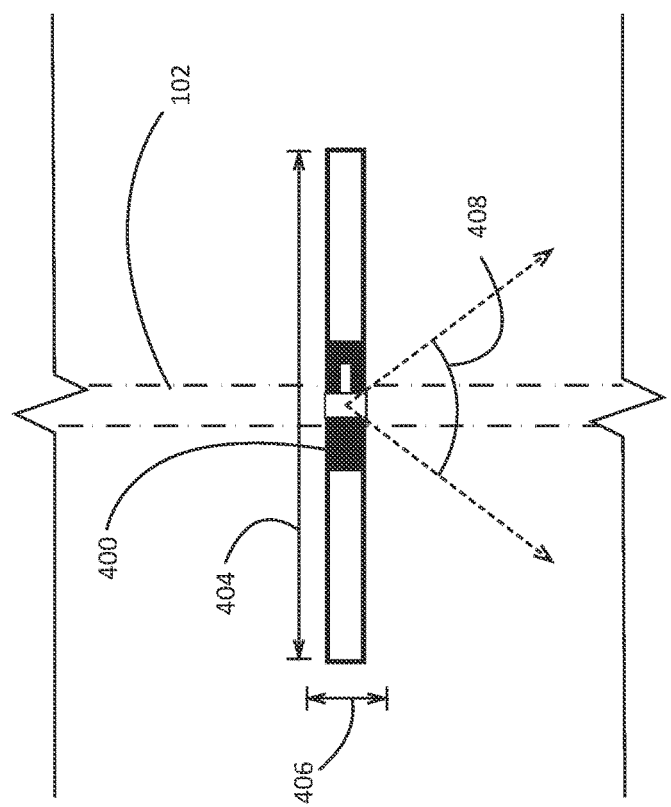

MOVING SORBENT PANEL SYSTEM FOR CAPTURING ATMOSPHERIC CARBON DIOXIDE

RELATED APPLICATIONS

This application claims the benefit of U.S. provisional patent application 63/185,956, filed May 7, 2021 titled "Movable Panel Carbon Dioxide Capture System," the entirety of the disclosure of which is hereby incorporated by this reference.

TECHNICAL FIELD

Aspects of this document relate generally to the collection of atmospheric carbon dioxide.

BACKGROUND

The need for technologies to remove carbon dioxide from ambient air has been well established. In addition to conservation, reduced-carbon processes, and on-site capture efforts, a significant amount of carbon dioxide will need to be removed from the atmosphere to avoid a looming climate change crisis. Nevertheless, the technologies are still new and the early air capture processes require large amounts of energy to operate. Since the carbon dioxide in the ambient air is very dilute, atmospheric $CO_2$ collectors can quickly overrun a tight energy budget for drawing in and processing air in bulk.

A promising technology that is well adapted for capturing dilute atmospheric carbon dioxide in an energy efficient manner is passive direct air capture, or passive DAC, which is distinguished from other DAC technologies which require additional energy for the forced convection of air. Air contactor surfaces that comprise sorbent materials are exposed to passive atmospheric air flows, capturing carbon dioxide with the sorbent material to be released within an appropriate context for further processing, use, and/or storage. One difficulty in the creation of passive DAC systems is increasing capture capacity and speed while reducing the cost to build and operate, endeavors that sometimes pull in opposing directions.

SUMMARY

According to one aspect, a system for capturing atmospheric carbon dioxide includes a track, and a plurality of panels moveably and pivotably coupled to the track. Each panel includes a sorbent material and an orientation with respect to the track. The system also includes a harvest house having a sorbent regeneration system and at least one aperture, and a propulsion system coupled to the track and configured to move each panel of the plurality of panels in a circuit including a collection phase and a release phase. For each panel of the plurality of panels, the collection phase of the circuit includes the panel moving along the track to expose the sorbent material to an airflow and allow the sorbent material to capture atmospheric carbon dioxide. For each panel of the plurality of panels, the release phase of the circuit includes the panel being sufficiently enclosed inside the harvest house that the sorbent regeneration system may operate on the sorbent material to release captured carbon dioxide from the sorbent material and form an enriched gas within the harvest house. The plurality of panels includes at least a first panel in the collection phase and at least a second panel in the release phase.

Particular embodiments may comprise one or more of the following features. The propulsion system may be configured such that, for each panel of the plurality of panels, the collection phase of the circuit includes the panel moving along the track at a speed such that the sorbent material is capturing atmospheric carbon dioxide throughout the collection phase and may be substantially loaded when the panel arrives at the harvest house at the end of the collection phase. Each panel of the plurality of panels may further include a primary dimension, a secondary dimension, and a tertiary dimension. The primary, secondary, and tertiary dimensions may be orthogonal to each other. The primary dimension may be at least equal to the secondary dimension and/or the tertiary dimension may be less than both the primary dimension and the secondary dimension. The at least one aperture of the harvest house may have an aperture width that may be greater than the tertiary dimension and less than the primary and secondary dimensions, and an aperture height that may be greater than the secondary dimension. For each panel of the plurality of panels, the orientation may be mechanically constrained to a predefined range. The system may further include a control system communicatively coupled to the propulsion system. Each panel of the plurality of panels may further include an actuator communicatively coupled to the control system and configured to modify the orientation of the panel. The system may further include a plurality of environmental sensors communicatively coupled to the control system. For each panel of the plurality of panels, the control system may modify the orientation of the panel based on an environmental condition observed by the plurality of sensors and/or a location of the panel along the track.

According to another aspect of the disclosure, a system for capturing atmospheric carbon dioxide, including a track and a plurality of panels moveably coupled to the track. Each panel includes a sorbent material. The system also includes a harvest house having a sorbent regeneration system and at least one aperture, and a propulsion system coupled to the track and configured to move each panel of the plurality of panels in a circuit having a collection phase and a release phase. For each panel of the plurality of panels, the collection phase of the circuit includes the panel moving along the track to expose the sorbent material to an airflow and allow the sorbent material to capture atmospheric carbon dioxide. For each panel of the plurality of panels, the release phase of the circuit includes the panel being sufficiently enclosed inside the harvest house that the sorbent regeneration system may operate on the sorbent material to release captured carbon dioxide from the sorbent material and form an enriched gas within the harvest house.

Particular embodiments may comprise one or more of the following features. The plurality of panels may include at least a first panel in the collection phase and at least a second panel in the release phase. The sorbent material may be a moisture-swing material. The propulsion system may be configured such that, for each panel of the plurality of panels, the collection phase of the circuit may include the panel moving along the track at a speed such that the sorbent material may be capturing atmospheric carbon dioxide throughout the collection phase and may be substantially loaded when the panel arrives at the harvest house at the end of the collection phase. Each panel of the plurality of panels may further include a primary dimension, a secondary dimension, and a tertiary dimension, the primary, secondary, and tertiary dimensions being orthogonal to each other. The primary dimension may be at least equal to the secondary dimension and the tertiary dimension may be less than both the primary dimension and the secondary dimension. The at least one aperture of the harvest house may have an aperture width that may be greater than the tertiary dimension and less than the primary and secondary dimensions, and an aperture height that may be greater than the secondary dimension. The propulsion system may include a plurality of engines movably coupled to the track, each engine configured to move a subset of the plurality of panels along the circuit. The propulsion system may include an engine that may be stationary with respect to the track. The propulsion system may further include a haul cable slidably coupled to and tracing the track, the engine and plurality of panels being coupled to the haul cable such that the engine pulls the plurality of panels along the track using the haul cable. Each panel of the plurality of panels may be pivotably coupled to the track and may include an orientation with respect to the track. For each panel of the plurality of panels, the orientation may be mechanically constrained to a predefined range. The system may further include a control system communicatively coupled to the propulsion system. Each panel of the plurality of panels may further include an actuator communicatively coupled to the control system and configured to modify the orientation of the panel. May further include a plurality of environmental sensors communicatively coupled to the control system. For each panel of the plurality of panels, the control system may modify the orientation of the panel based on an environmental condition observed by the plurality of sensors and/or a location of the panel along the track. The plurality of panels may be releasably coupled to the track. Transitioning from the collection phase to the release phase may include decoupling from the track. The track may pass through the harvest house. For each panel of the plurality of panels, transitioning from the collection phase to the release phase may include the panel becoming slidably coupled to the propulsion system.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and:

FIGS. 3A and 3B are schematic views of embodiments of a propulsion system;

FIGS. 4A, 4B, and 4C are front, side, and top views of a sorbent panel, respectively;

DETAILED DESCRIPTION

Figure 1:
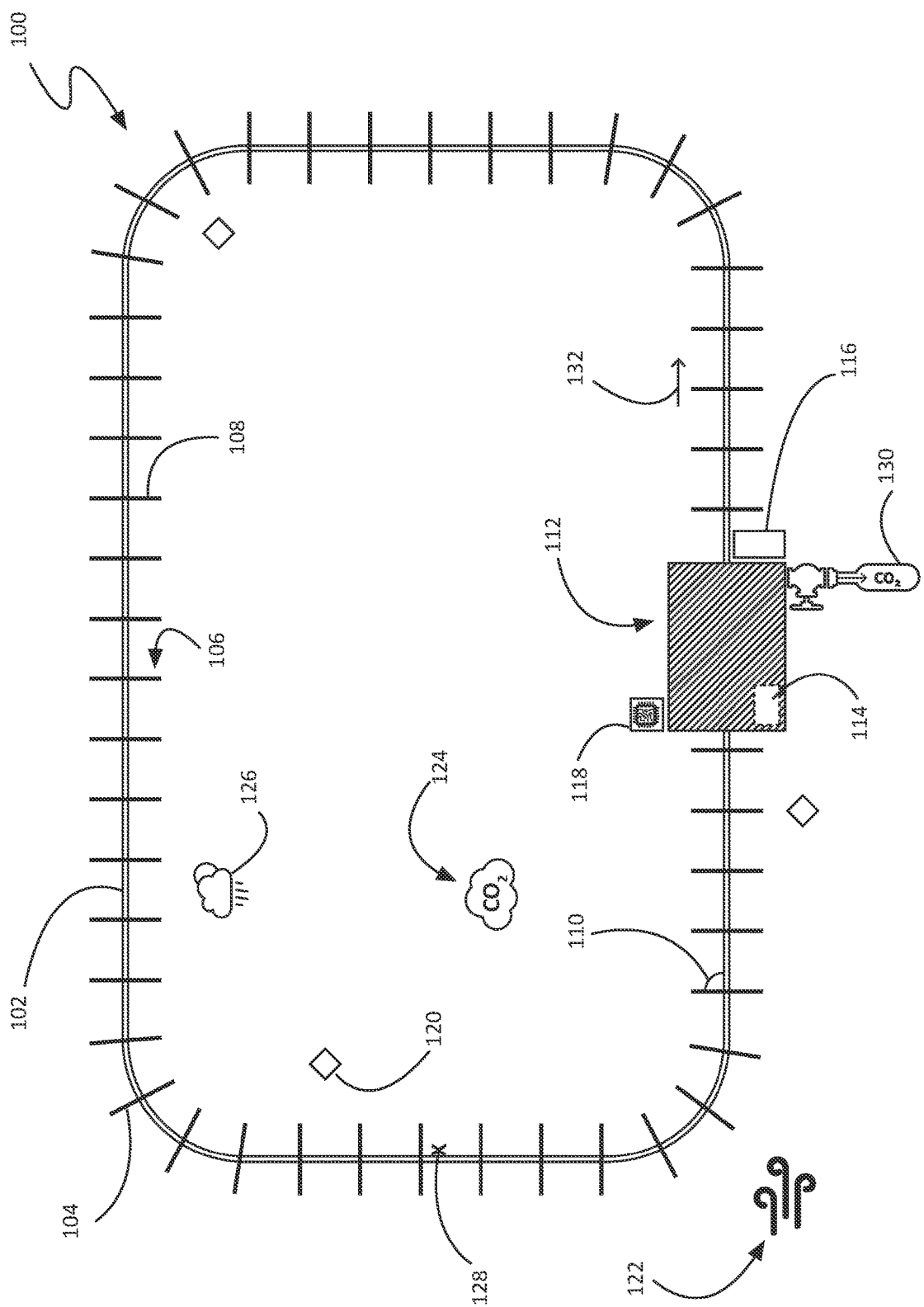
FIG. 1 is a schematic view of a moving sorbent panel system for capturing atmospheric carbon dioxide.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

The need for technologies to remove carbon dioxide from ambient air has been well established. In addition to conservation, reduced-carbon processes, and on-site capture efforts, a significant amount of carbon dioxide will need to be removed from the atmosphere to avoid a looming climate change crisis. Nevertheless, the technologies are still new and the early air capture processes require large amounts of energy to operate. Since the carbon dioxide in the ambient air is very dilute, atmospheric $CO_2$ collectors can quickly overrun a tight energy budget for drawing in and processing air in bulk.

A promising technology that is well adapted for capturing dilute atmospheric carbon dioxide in an energy efficient manner is passive direct air capture, or passive DAC, which is distinguished from other DAC technologies which require additional energy for the forced convection of air. Air contactor surfaces that comprise sorbent materials are exposed to passive atmospheric air flows, capturing carbon dioxide with the sorbent material to be released within an appropriate context for further processing, use, and/or storage. One difficulty in the creation of passive DAC systems is increasing capture capacity and speed while reducing the cost to build and operate, endeavors that sometimes pull in opposing directions.

Contemplated herein is a moving sorbent panel system for the passive collection of carbon dioxide. The contemplated moving sorbent panel system (hereinafter MSP system) improves on conventional DAC systems by increasing the scale of the capture portion of the system without requiring an equal increase in the scale of the more expensive harvest portion. Capture panels repeat a circuit on a track, exposed to natural air currents. The panels are $CO_2$-laden by the time they reach the harvest house, in which they are enclosed and the captured $CO_2$ is harvested. Such a geometry allows for a larger capture footprint with a minimal harvest infrastructure, allowing a greater volume of $CO_2$ to be captured from the atmosphere over a shorter period of time, at a smaller setup and operation cost than would be incurred by simply scaling up the number of other DAC devices with smaller footprints.

It should be noted that while the contemplated systems and methods are discussed below in the context of passively capturing atmospheric carbon dioxide from natural air flows, these systems and methods may be adapted for use in the capture of other gases, and in other contexts. For example, some embodiments may be adapted for use within an enclosed or indoor environment, making use of incidental air flows and/or deliberately forced airflows.

FIG. 1 is a schematic view of a non-limiting example of a moving sorbent panel system 100 for capturing atmospheric carbon dioxide 124. As shown, the system 100 comprises a track 102 along which a plurality of panels 104 move, and a harvest house 112 that is on, or near, the track 102. The panels 104 comprise a sorbent material 106 that absorbs the atmospheric carbon dioxide 124. Captured carbon dioxide is then released within the harvest house 112.

In the context of the present description and the claims that follow, a track 102 is a structure that constrains the movement of a panel 104, and that guides a moving panel 104 along a path. In some embodiments, the track 102 is a structure from which a panel 104 hangs, or on which a panel 104 rests, such as a rail or the like. In other embodiments, the track 102 may be a structure that receives at portion of the panel 104, and that portion moves along an interior of the track 102 (e.g., a groove, etc.). In some embodiments, the panels 104 hang from a single track 102, while in other embodiments, the panels 104 may be moveably coupled to multiple tracks 102 (e.g., one above and one below, etc.). The panels 104 will be discussed in greater detail with respect to FIGS. 4A-4C, below.

In some embodiments, the track 102 may be circular or oval-shaped. In other embodiments, the track 102 may be shaped to accommodate the terrain in which the system 100 is deployed. As a specific example, the track 102 may be shaped to avoid a large obstacles located near an otherwise ideal location for the system 100 (e.g., accessible, viable source of water and/or power, good air currents, etc.). The systems 100 contemplated herein are able to be adapted for use in many locations, without sacrificing their inherent efficiencies.

In some embodiments, the system 100 may comprise a single track 102. In other embodiments, the system 100 may comprise multiple tracks 102. In some embodiments, multiple tracks 102 may be employed simultaneously, all having moving panels 104 that are eventually harvested within a harvest house 112 shared between the tracks 104. In other embodiments, the system 100 may opt to use one track 102 over another depending on ambient conditions. As a specific example, in one embodiment, the system 100 may have two tracks 102, one that is very exposed, receiving great air flows but little protection, and another that is partially sheltered, allowing for continued system operation during conditions (e.g., high wind, storms, etc.) that would otherwise damage the panels 104 if they were on the other track 102.

In the context of the present description and the claims that follow, a panel 104 is a structure comprising a sorbent material 106 and configured to move along the track 102. In some embodiments, the panel 104 may be constructed with the intention of natural air flows passing through the panel 104, in one side of the panel 104 and out the other (e.g., panel 104 using sorbent material 106 in the form of a fabric or fibers, etc.) This may be advantageous during regeneration inside the harvest house 112, facilitating the exposure of the sorbent material 106 to the release medium. In other embodiments, the panel 104 may be constructed with the intention of natural air flows passing over the surfaces of the panel 104 (e.g., panel 104 using sorbent material 106 that is a solid membrane or the like, etc.). In either case, the sorbent material 106 is held by the structure in such a way that it is exposed to said airflows.

According to various embodiments, each panel 104 comprises at least one sorbent material 106. The sorbent material 106 may be any sorbent material 106 known in the art whose release or regeneration medium is compatible with the harvest house 112. Examples include, but are not limited to, moisture-swing materials 108, heat-swing materials, electro-swing materials, and the like.

In some embodiments, the orientation 110 of the panel 104 with respect to the track 102 may be fixed (i.e., the panel 104 faces the same direction with respect to the direction of motion throughout the track 102). In other embodiments, the panel 104 may, in addition to being slidably or movably coupled to the track 102, may also be pivotably coupled, allowing the orientation 110 of the panel 104 with respect to the track 102 to change. In some embodiments, the coupling between the panel 104 and the track 102 may be configured to freely pivot. Panel orientation 110 will be discussed in greater detail with respect to FIGS. 4A-4C, below.

The track 102 passes through, or near, a harvest house 112. In the context of the present description and the claims that follow, a harvest house 112 is an enclosed or semi-enclosed space within which one or more panels 104 are relieved of their captured carbon dioxide 124.

In some embodiments, at least a part of the track 102 (e.g., a single rail, two rails, etc.) passes through the harvest house 112, allowing panels 104 to move through the harvest house 112 while remaining on the track 102. In other embodiments, the track 102 may pass near the harvest house 112, but the panels 104 move either off of the track 102, or the track 102 jogs out in a sharp deviation from the rest of the circuit, temporarily inserting the circuit panel 104($s$) into the harvest house 112 for harvesting. An example of this will be discussed in greater detail with respect to FIG. 6, below.

The process used within the harvest house 112 to release the captured $CO_2$ and prepare the panels 104 for another trip around the track 102 will depend on the nature of the panels 104, and the sorbent materials 106 used. As shown, the harvest house 112 comprises a sorbent regeneration system 114 that is appropriate for the sorbent materials 106 being used. According to various embodiments, the harvest house 112 may employ at least one of heat, a release chemical, steam, moisture or liquid water, electricity, and the like to cause the $CO_2$-laden sorbent material 106 of the panel(s) 104 to release the carbon dioxide 124 captured from the atmosphere. Those skilled in the art will recognize that the harvest house 112 may be adapted for use with other swing-based sorbents, including materials not yet discovered.

Once released from the panel(s) 104 within the harvest house 112, the carbon dioxide 124 is moved to a collection point that provides an exit from the chamber. In some embodiments, the harvest house 112 may have multiple exits for the released $CO_2$. In some embodiments, the harvested $CO_2$ remains a $CO_2$-enriched gas 130. In other embodiments, the harvest house 112 may comprise additional systems to concentrate and/or purify the enriched gas 130.

In some embodiments, the $CO_2$-enriched gas 130 may be moved to the exit(s) using a sweep gas, such as air, steam, and the like. In other embodiments, the $CO_2$-enriched air may be moved out the exits using blowers, or the like. Sweep gas will be discussed in greater detail with respect to FIGS. 5A-5C, below.

One of the advantages of the contemplated system 100 is that the use of the track 102 allows for a large capture area and increased area of exposed sorbent 106, without requiring an equally expanded regeneration system. According to various embodiments, the harvest house 112 may be sized to minimize the internal volume (and thus, the amount of regeneration media/energy needed), without overly inhibiting the ability for fluid to move amongst the panels 104, distributing the regeneration media.

In some embodiments, other factors may influence the size and shape of the harvest house 112. For example, in one embodiment, the harvest house 112 may be made large enough that all of the panels 104 used by the system 100 can fit inside at the same time. This may be beneficial in locations with severe weather. The panels 104 can shelter inside the harvest house 112, where they will be protected from damage.

In some embodiments, the harvest house 112 may be sized and shaped to take advantage of prebuilt structures. Examples include, but are not limited to, repurposed train cars and/or shipping containers, and pipes (combined with circular panels 104).

In the context of the present description and the claims that follow, a propulsion system 116 is a mechanism or collection of mechanisms that cause the panels 104 to move about the track 102. The propulsion system 116 will be discussed in greater detail with respect to FIGS. 3A and 3B, below.

As shown, the track 102 runs along a path, looping back on itself. According to various embodiments, the panels 104 move along the track 102, absorbing carbon dioxide 124 from the atmosphere as they are exposed to natural airflows 122. The movement along the track 102 provides time for the panels 104 to pick up the carbon dioxide 124. According to various embodiments, the speed 132 with which the panels 104 move along the track 102 may be tuned such that each panel 104 is capturing carbon dioxide for its entire journey about the track 102, ultimately arriving at the harvest house 112 just as it becomes saturated, unable to capture any more $CO_2$. According to various embodiments, this speed tuning may be accomplished using a control system 118.

In the context of the present description and the claims that follow, a control system 118 is an electronic system that is communicatively coupled to the propulsion system 116, and is configured to control the propulsion system 116 to enhance the performance of the system 100 (e.g., more resource efficient, greater yield, etc.). In some embodiments, the control system 118 may also be communicatively coupled to the harvest house 112, particularly the sorbent regeneration system 114, for the same purpose.

As shown, in some embodiments, the control system 118 may also be communicatively coupled to a plurality of environmental sensors 120, able to observe different ambient environmental conditions 126 which may include, but are not limited to, temperature, wind speed, wind direction, relative humidity, sun exposure, and the like. The control system 118 may adjust the speed 132 of the panels 104 in response to observing a particular ambient condition.

Another aspect that may be adjusted by the control system 118, in some embodiments, is the orientation 110 of the panels with respect to the track 102. For example, in some embodiments, the control system 118 may use observations about the position and intensity of the sun in the sky, combined with the location 128 of a panel 104 on the track 102, to determine an optimal orientation 110 for that particular panel 104 at that part of the track 102. Other aspects that may be adjusted by a control system 118 to improve performance include, but are not limited to, the number of panels 104 in use (e.g., high wind leading to enhanced exposure may mean fewer panels need to be used to reach the maximum output the harvest house 112 is capable of, etc.), speed 132, orientation 110, spacing between panels 104 on the track 102 during exposure and/or harvest, and the like.

The contemplated system 100 may be implemented in a wide range of environments, including rural environments. Various embodiments may also be implemented in deliberately constructed environments including, but not limited to, the base of a cooling tower, and a solar chimney.

Figure 2:
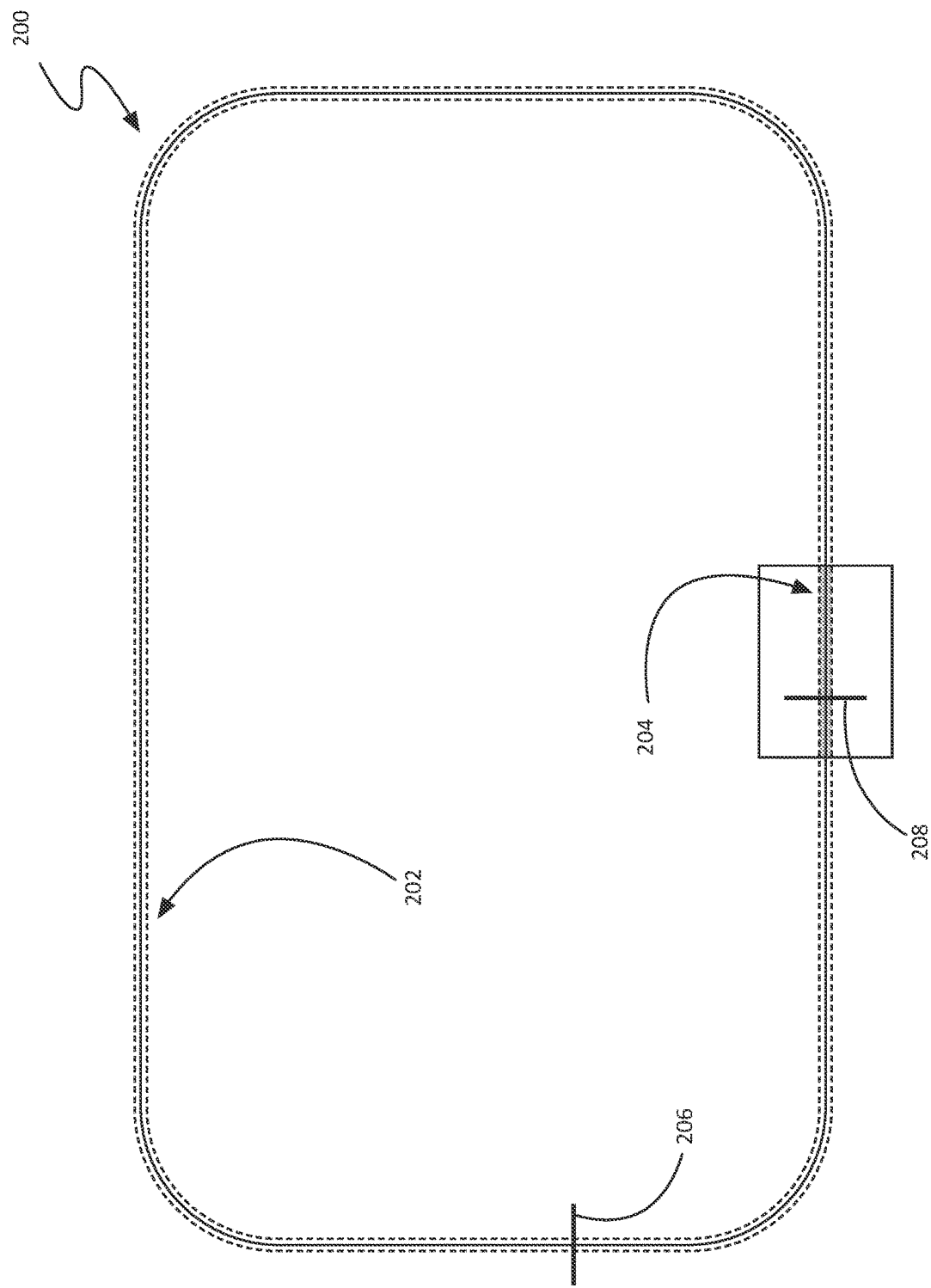
FIG. 2 is a schematic view of a circuit.

FIG. 2 is a schematic view of a non-limiting example of a circuit 200 within a MPS system 100. In the context of the present description and the claims that follow, a circuit 200 is the sequence of events that a panel 104 repeatedly goes through that accomplishes the task of pulling carbon dioxide 124 out of the atmosphere. As shown, the circuit 200 comprises a collection phase 202, where the panel 104 is moving along the track 102 to expose the sorbent material 106 to an airflow 122 and allow the sorbent material 106 to capture atmospheric carbon dioxide 124, and a release phase 204, where the panel 104 is sufficiently enclosed inside the harvest house 112 that the sorbent regeneration system 114 may operate on the sorbent material 106 to release captured carbon dioxide 124 from the sorbent material 106 and form an enriched gas 130 within the harvest house 112. At the end of the release phase 204, the now-empty panels 104 continue onward, beginning another lap around the track 102. According to various embodiments, the system 100 may have at least a first panel 206 in the collection phase 202, and simultaneously have a second panel 208 in the release phase 204. There is typically more panels 104 in the collection phase 202 than in the release phase 204 at any given moment in a system 100, according to various embodiments.

Figure 3B:
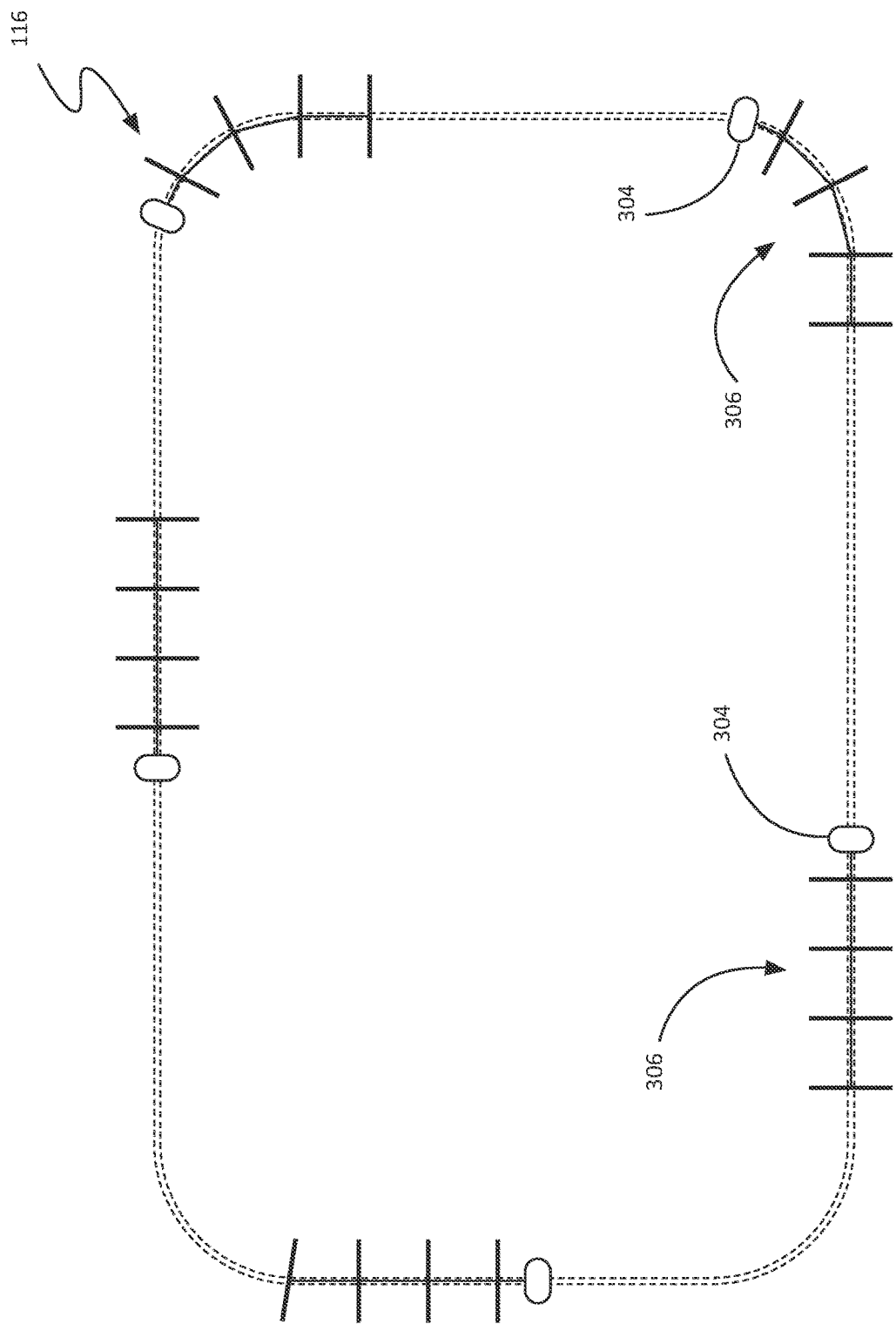

FIGS. 3A and 3B are schematic views of embodiments of a non-limiting example of a propulsion system 116 within an MPS system 100. In some embodiments, the panels 104 may be driven along the track 102 by an engine 300 coupled to the track 102, and stationary with respect to the track 102. For example, in some embodiments, the propulsion system 116 may comprise an engine 300 that is coupled to a haul cable 302 that runs along the path of the track 102 (and is slidably coupled to the track 102). The panels 104 are able to grip the haul cable 302 that is moving. Once coupled to the haul cable 302, it will pull the panels 104 around the track 102. See FIG. 3A.

In other embodiments, the panels 104 may be driven by a plurality of engines 304 that travel along the track 102, pushing or pulling a subset 306 of panels about the track 102. See FIG. 3B. As an option, in one embodiment, each panel 104 may comprise a small engine 300 to drive that particular panel 104. Such an arrangement may be advantageous for remote or autonomous repair, where a jammed or malfunctioning panel 104 may simply be released from the track 102 without interfering with the other panels 104.

Figure 4A:
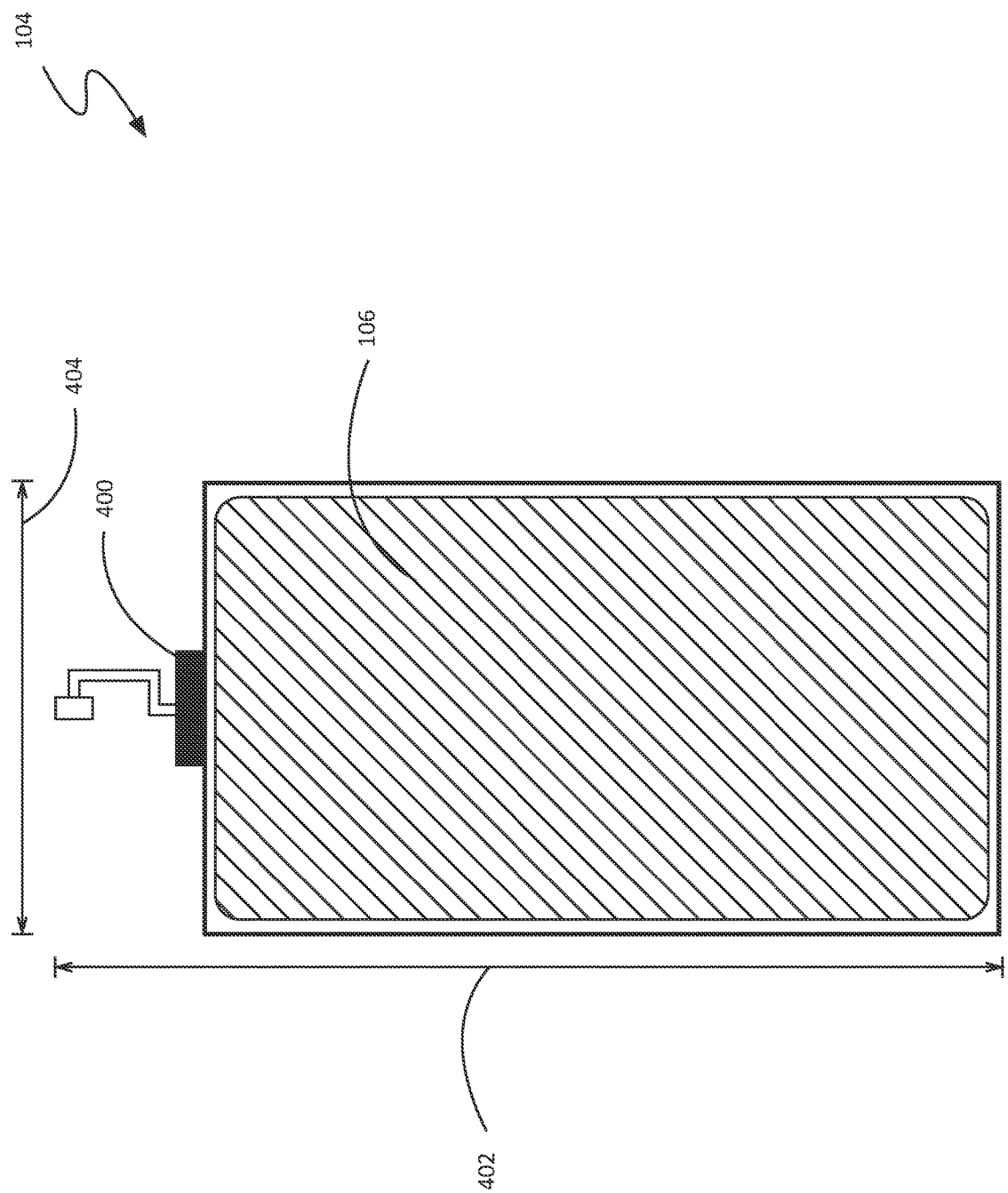

FIGS. 4A, 4B, and 4C are front, side, and top views of a non-limiting example of a sorbent panel 104, respectively. As previously mentioned, in some embodiments, the panels 104 may be pivotably coupled to the track 102, allowing their orientation 110 with respect to the track 102 to change. In some embodiments, the panels 104 may spin freely, moved by the airflow 122, which does not require any power. In some embodiments, the range of pivoting may be limited to a particular range 408. This may be accomplished by placing a mechanical constraint on the rotation of the panel 104; as an option, in some embodiments that mechanical constraint may be adjustable, such that the predefined range 408 of allowed orientation 110 may be adjusted after a system 100 has been installed.

In other embodiments, the orientation 110 of the panel 104 may be deliberately changed, and may be dynamically modified throughout a circuit 200. For example, in some embodiments, each panel 104 may comprise an actuator 400 that is communicatively coupled to the control system 118 (e.g., wireless communication, wired connection, etc.) and configured to modify the orientation 110 of the panel 104 in accordance with instructions received from the control system 118. Having this degree of control is advantageous, as it allows the control system 118 to modify the orientation 110 (along with other aspects like speed and panel spacing, in some embodiments) to take advantage of or otherwise address ambient conditions 126 (e.g., wind strength, wind direction, weather systems, the position of the sun, etc.). In some embodiments, the orientation 110 of individual panels 104 may be modified by an artificial intelligence, through the control system 118, adapting to current conditions based on historical performance and observations.

It should be noted that while in some embodiments, the orientation 110 of the panels 104 may be changed simultaneously and identically, in other embodiments the orientation 110 of individual panels 104, or subsets 306 of panels 104 (e.g., the subset 306 pulled by the same mobile engine 300, etc.) may be adjusted independent of other panels 104. Having this degree of control is advantageous in avoiding "wind shadowing", where some panels 104 might diminish the airflow to which trailing panels 104 are exposed.

Furthermore, it should be noted that while in some embodiments the spacing between neighboring panels 104 may be uniform throughout the plurality of panels 104 in the collection phase, in other embodiments, the spacing between individual neighboring pairs of panels 104, or between panels 104 making up a subset 306, may be adjusted independent of other panels 104 in the system 100.

In some embodiments, the orientation of the panel 104 may be modified with an actuator 400. In some embodiments, the orientation 110 may also be modified with less complicated mechanisms, such as collision with an obstacle that forces each panel 104 to assume a particular orientation 110 as it passes by. As a specific example, in some embodiments the opening which panels 104 use to enter the harvest house 112 may be too small for the panel 104 to fit in some orientations (see, for example, the harvest house 112 shown in FIGS. 5A-5C). An obstacle may be used to force the panels 110 to turn sideways as they approach the harvest house 112 so they can fit.

As shown, each panel 104 has a primary dimension 402, a secondary dimension 404, and a tertiary dimension 406, which are all orthogonal to each other. According to various embodiments, the panels 104 may have a variety of shapes. While the sorbent panel 104 shown in FIGS. 4A-4C is rectangular, in other embodiments the sorbent panels 104 may be different shapes. For example, in one embodiment, the panels 104 may be circular, for use in a harvest house 112 that is made from a pipe. It may be advantageous for panels 104 to be thin in one dimension, so more total surface area of $CO_2$-laden sorbent material 106 can be loaded inside the harvest house 112 for a release phase 204. According to various embodiments, the primary dimension 402 is greater than or equal to the secondary dimension 404, and the tertiary dimension 406 is less than both the primary dimension 402 and the secondary dimension 404.

Figure 5A:
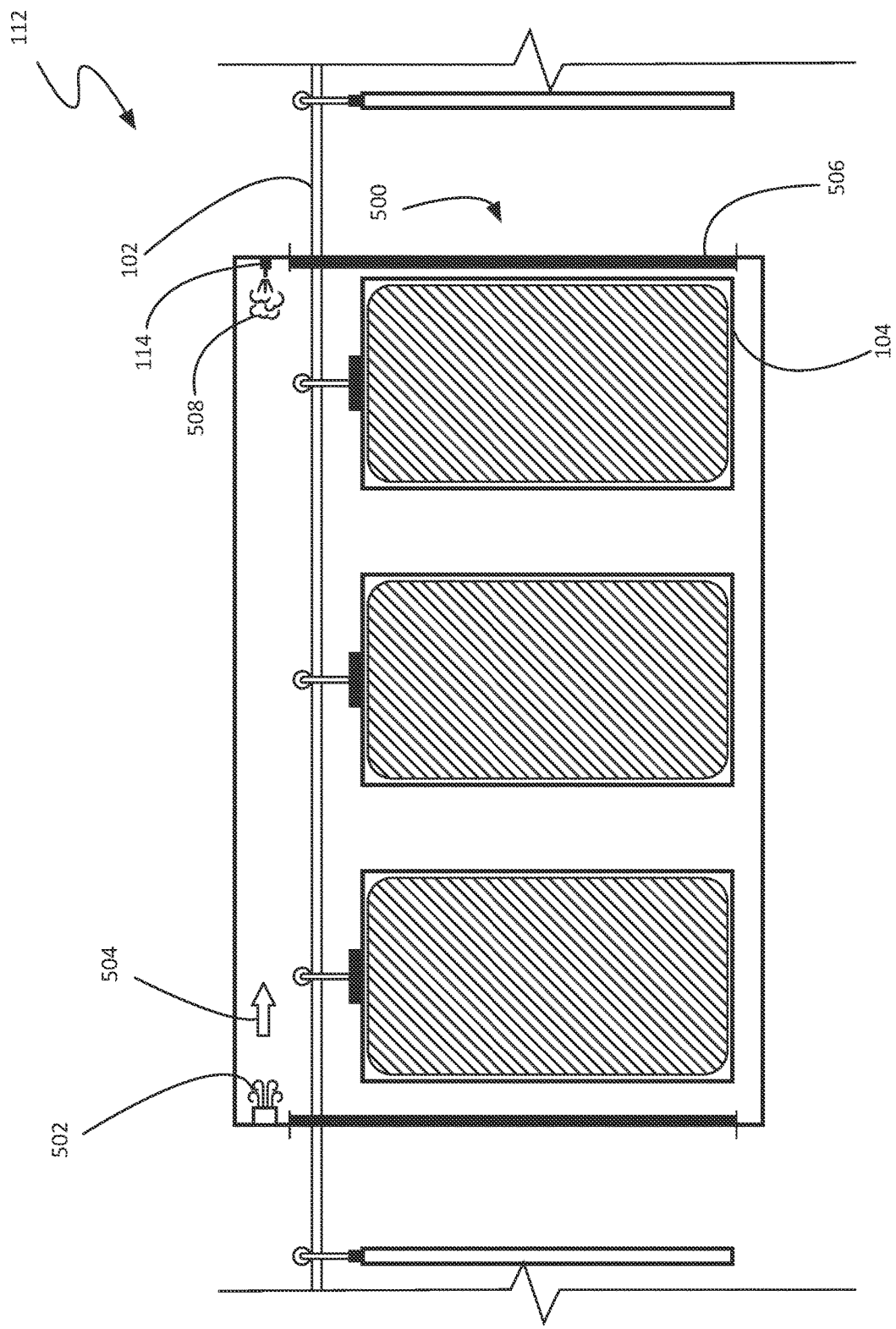
FIGS. 5A, 5B, and 5C are front, side, and top views of a harvest house, respectively.
Figure 5B:
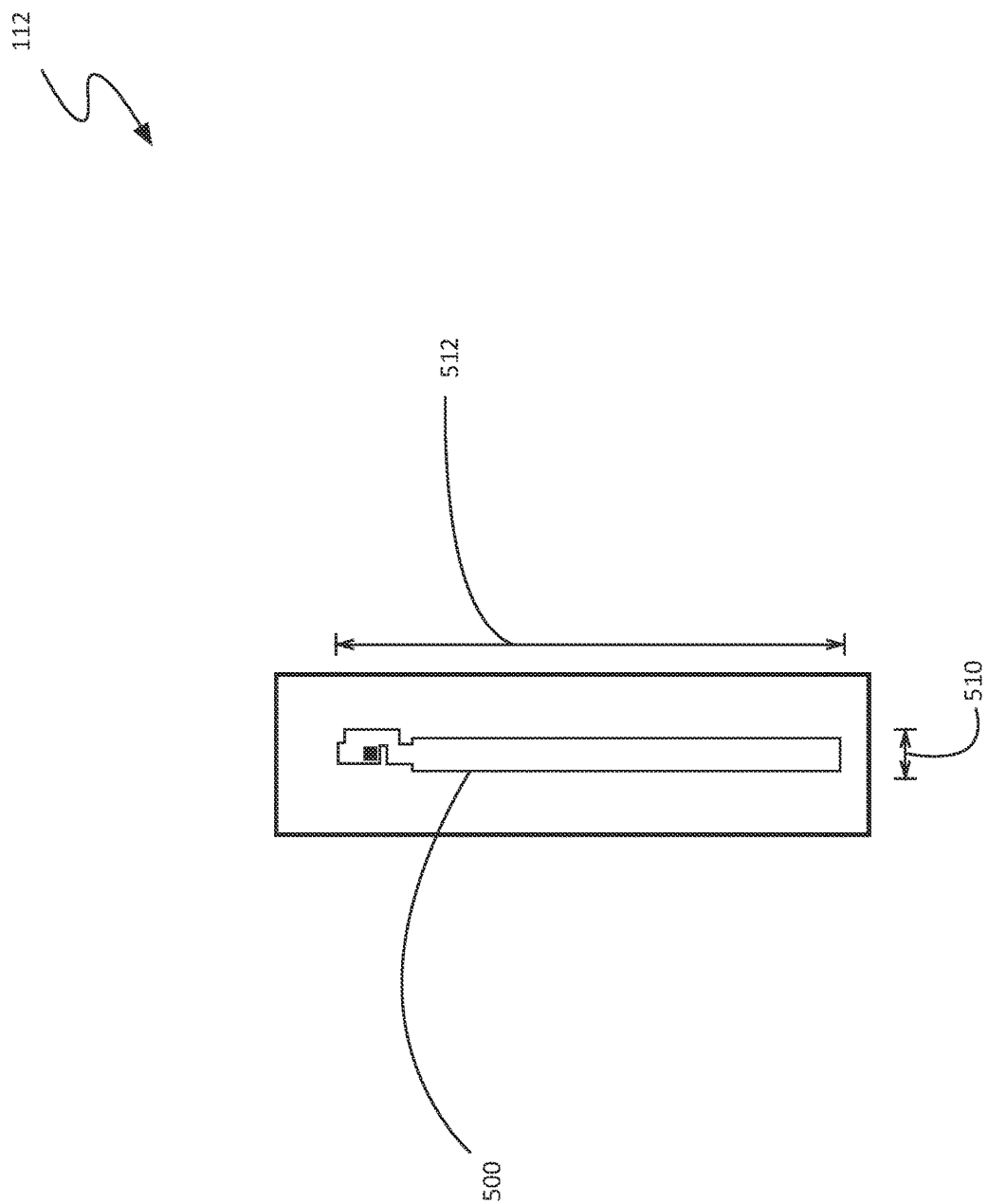
Figure 5C:
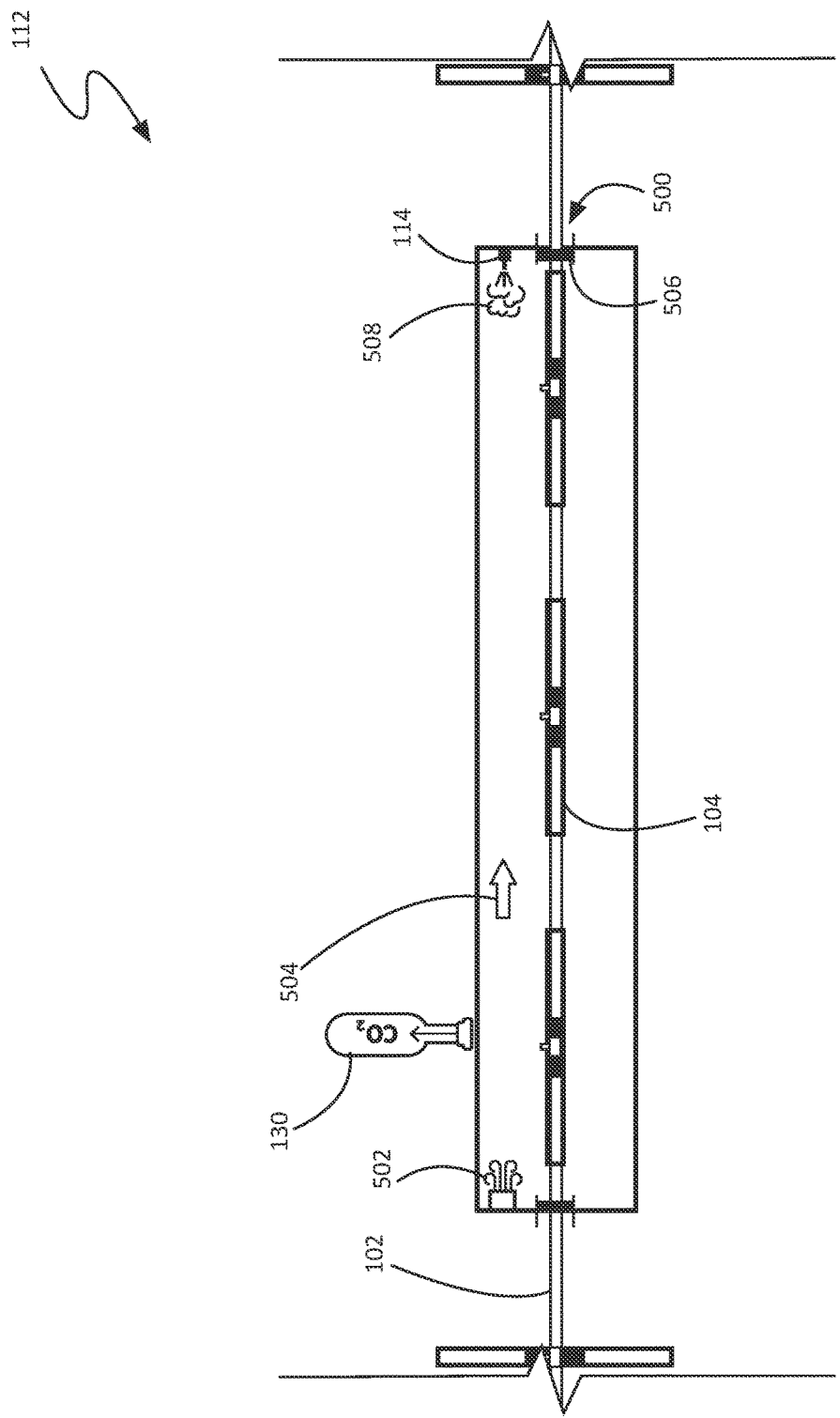

FIGS. 5A, 5B, and 5C are front, side, and top views of a non-limiting example of a harvest house 112, respectively. As shown, the harvest house 112 comprises a sorbent regeneration system 114 and at least one aperture 500. Also shown is the track 102 and a plurality of panels 104 passing through the harvest house 112 in the release phase 204. As previously mentioned, panels 104 that are in the release phase 204 are enclosed within the harvest house 112, where conditions are created that cause the captured carbon dioxide to be released from the sorbent material 106. These conditions may be created by the introduction of a regeneration medium 508 into the harvest house 112. In some embodiments, the regeneration medium 508 may be a gas, such as water vapor, and it may be heated. As a specific example, in one embodiment the regeneration medium 508 is heated water vapor released into the harvest house 112 at roughly one atmosphere of pressure. In other embodiments, the regeneration medium 508 may be a liquid, such as liquid water. As a specific example, in one embodiment, the sorbent material 106 of the panels 104 may be sprayed with droplets of liquid water. In another embodiment, one or more panels 104 may be immersed in a liquid regeneration medium 508.

The harvest house 112 may be thought of as a chamber that is able to receive one or more panels 104, and then seal in such a way that the released carbon dioxide 124 is substantially retained (e.g., minimal losses may occur without impacting the overall efficiency of the system 100, in some embodiments). According to various embodiments, the target concentration of the enriched gas 130 dictates the degree to which the harvest house 112 needs to be sealed. According to various embodiments, the harvest house 112 has at least one aperture 500 through which panels 104 pass. In some embodiments, the harvest house 112 may be open on one or two ends (e.g., one end, two distal ends, etc.), permitting the entrance and exit of the panels 104 on the track 102. Once one or more $CO_2$-laden panels 104 are inside the harvest house 112, it is enclosed and the regeneration process begins.

In some embodiments, the harvest house 112 may enclose the one or more panels 104 using doors 506 that open and close around the track 102 (or the portion of track 102 passing into/through the harvest house 112). In other embodiments, this door 506 may be enhanced, or entirely replaced, by driven air flows that serve to restrict the loss of collected $CO_2$ while panels 104 are entering or departing the harvest house 112.

As shown, the one or more apertures 500 of a harvest house 112 have an aperture width 510 and an aperture height 512. According to various embodiments, the aperture width 510 is greater than the tertiary dimension 406 of the panel 104 and less than the primary dimension 402 and secondary dimension 404. The aperture height 512 is greater than the secondary dimension 404. This permits the use of a smaller aperture 500, helping reduce the amount of released $CO_2$ lost during the release phase 204.

In some embodiments, all of the panels 104 that are in the harvest house 112 (i.e., in the release phase 204) may not be loaded and unloaded from the harvest house 112 at the same time. In some embodiments, panels 104 transition between the release phase 204 and collection phase 202 individually. In other embodiments, these transitions may be made in groups, with multiple groups at various locations in the collection phase 202, and a single group in the release phase 204. In embodiments where the phase transitions are occurring individually, a significant amount of carbon dioxide may be lost from the harvest house 112 every time an aperture 500 is opened to admit or remove a panel 104. In some embodiments, these loses may be mitigated by a counter stream of sweep gas 502.

After the carbon dioxide has been released into the harvest house 112, it needs to be extracted. According to various embodiments, a sweep gas 502 flowing in a direction 504 (e.g., towards a collection point) is used to gather the released gases. In some embodiments, a series of pressure drops between panels 104 helps ensure that the sweep gas 502 flows in one direction 504, improving the efficiency of the collection and preventing mixing or inadvertently sending $CO_2$ back to the freely unburdened sorbent material 106.

Figure 6:
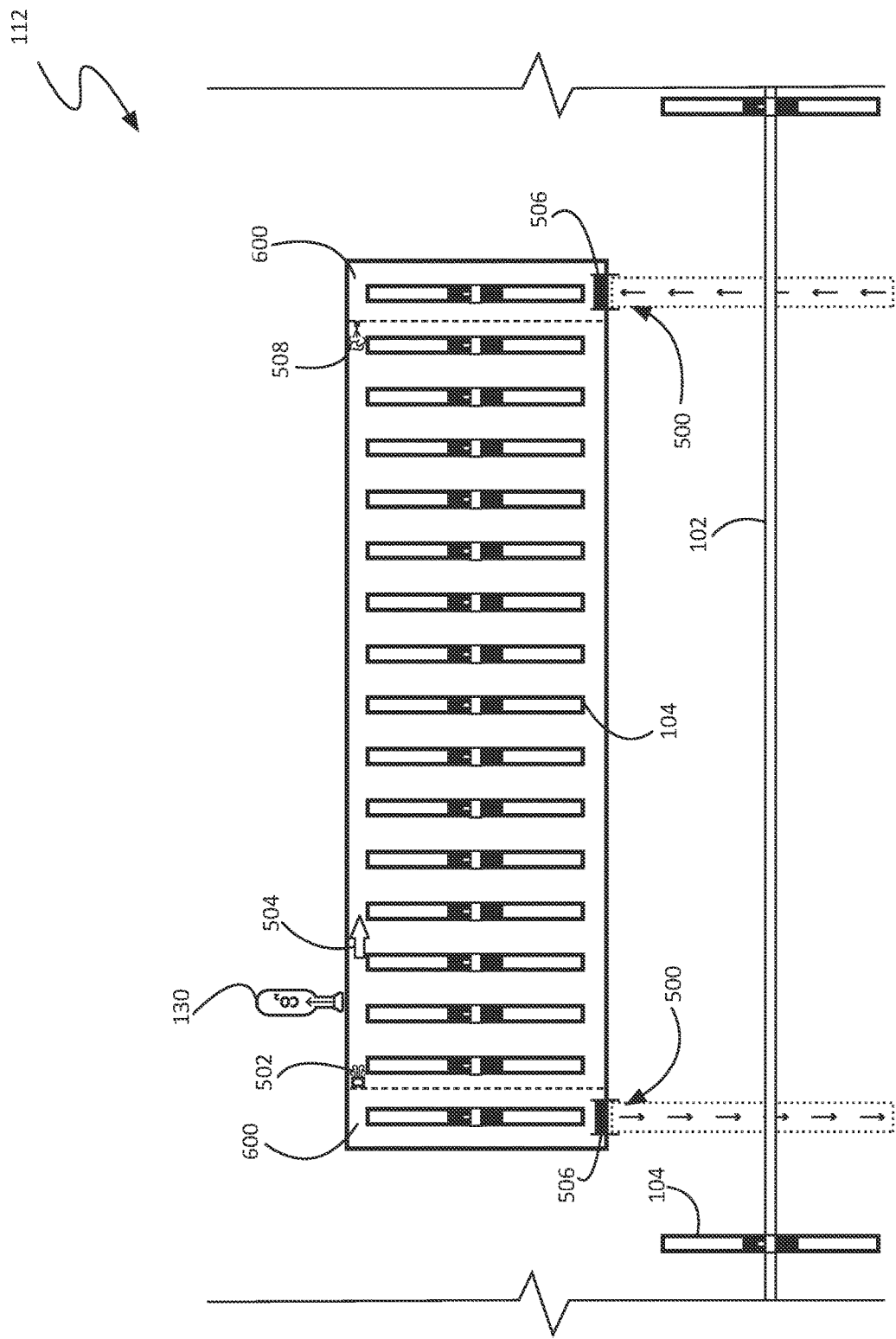
FIG. 6 is a top view of another embodiment of a harvest house.

FIG. 6 is a top view of another embodiment of a non-limiting example of a harvest house 112. Unlike the non-limiting example shown in FIGS. 5A-5C, this embodiment of the harvest house 112 comprises a more densely packed interior, due to a change in orientation 110 of panels 104. Additionally, the panels 104 are decoupled from the track 102 as they transition from the collection phase 202 to the release phase 204.

As shown, the harvest house 112 may comprise one or more airlocks 600. In the context of the present description and the claims that follow, an airlock 600 is a pair of doors or other sealing mechanism that are operated sequentially to admit or release one or more panels 104 in such a way that the bulk of the interior of the harvest house 112 is never in direct fluid communication with the exterior of the harvest house 112.

Another approach to the harvest house 112 includes a single aperture embodiment, where panels 104 are lowered into the harvest house 112 for release and then lifted up. The loss of carbon dioxide through the single aperture 500 may be mitigated by modifying the internal temperature (i.e., increasing the density) or using a liquid regeneration medium 508.

As mentioned above, in some embodiments, the track 102 passes through the harvest house 112 (or at least a portion of the track 102), allowing the panels 104 to move directly into and out of the harvest house 112. In other embodiments, the harvest house 112 may be proximate the track 102, such that one or more panels 104 may be moved away from the general path of the circuit and into the harvest house 112. Such an arrangement, where the track 102 does not actually pass through the harvest house 112, may be easier to seal and prevent loss of $CO_2$, since the door would not have to accommodate the track(s) 102.

As an option, in some embodiments, the panels 104 may remain engaged with the track 102, but may disengage from the haul cable 302, causing them to move slower than the panels 104 that are in the collection phase 202. This may be advantageous for embodiments where the harvest house 112 is admitting/releasing panels 104 individually as they slowly move through the interior.

Where the above examples, embodiments and implementations reference examples, it should be understood by those of ordinary skill in the art that other moving sorbent panel systems and methods and examples could be intermixed or substituted with those provided. In places where the description above refers to particular embodiments of moving sorbent panel systems, and methods, it should be readily apparent that a number of modifications may be made without departing from the spirit thereof and that these embodiments and implementations may be applied to other carbon dioxide collection devices, systems, and methods as well. Accordingly, the disclosed subject matter is intended to embrace all such alterations, modifications and variations that fall within the spirit and scope of the disclosure and the knowledge of one of ordinary skill in the art

What is claimed is:

1. A system for capturing atmospheric carbon dioxide, comprising:
   a track;
   a plurality of panels moveably and pivotably coupled to the track, each panel comprising a sorbent material and an orientation with respect to the track;
   a harvest house comprising a sorbent regeneration system and at least one aperture; a propulsion system coupled to the track and configured to move each panel of the plurality of panels in a circuit comprising a collection phase and a release phase; and a control system communicatively coupled to the propulsion system, wherein, for each panel of the plurality of panels, the collection phase of the circuit comprises the panel moving along the track to expose the sorbent material to an airflow and allow the sorbent material to capture atmospheric carbon dioxide;

wherein, for each panel of the plurality of panels, the release phase of the circuit comprises the panel being sufficiently enclosed inside the harvest house that the sorbent regeneration system may operate on the sorbent material to release captured carbon dioxide from the sorbent material and form an enriched gas within the harvest house, wherein the plurality of panels comprises at least a first panel in the collection phase and at least a second panel in the release phase, and wherein each panel of the plurality of panels further comprises an actuator communicatively coupled to the control system and configured to modify the orientation of the panel.

2. The system of claim 1, wherein the propulsion system is configured such that, for each panel of the plurality of panels, the collection phase of the circuit comprises the panel moving along the track at a speed such that the sorbent material is capturing atmospheric carbon dioxide throughout the collection phase and is substantially loaded when the panel arrives at the harvest house at the end of the collection phase.

3. The system of claim 1:

wherein each panel of the plurality of panels further comprises a primary dimension, a secondary dimension, and a tertiary dimension, the primary, secondary, and tertiary dimensions being orthogonal to each other;

wherein the primary dimension is at least equal to the secondary dimension and the tertiary dimension is less than both the primary dimension and the secondary dimension; and wherein the at least one aperture of the harvest house has an aperture width that is greater than the tertiary dimension and less than the primary and secondary dimensions, and an aperture height that is greater than the secondary dimension.

4. The system of claim 1 wherein, for each panel of the plurality of panels, the orientation is mechanically constrained to a predefined range.

5. The system of claim 1, further comprising:

a plurality of environmental sensors communicatively coupled to the control system;

wherein, for each panel of the plurality of panels, the control system modifies the orientation of the panel based on an environmental condition observed by the plurality of sensors and a location of the panel along the track.

6. A system for capturing atmospheric carbon dioxide, comprising:

a track;

a plurality of panels moveably coupled to the track, each panel comprising a sorbent material;

a harvest house comprising a sorbent regeneration system and at least one aperture; and a propulsion system coupled to the track and configured to move each panel of the plurality of panels in a circuit comprising a collection phase and a release phase;

wherein, for each panel of the plurality of panels, the collection phase of the circuit comprises the panel moving along the track to expose the sorbent material to an airflow and allow the sorbent material to capture atmospheric carbon dioxide;

wherein, for each panel of the plurality of panels, the release phase of the circuit comprises the panel being sufficiently enclosed inside the harvest house that the sorbent regeneration system may operate on the sorbent material to release captured carbon dioxide from the sorbent material and form an enriched gas within the harvest house, and wherein each panel of the plurality of panels is pivotably coupled to the track and comprises an orientation with respect to the track.

7. The system of claim 6, wherein the plurality of panels comprises at least a first panel in the collection phase and at least a second panel in the release phase.

8. The system of claim 6, wherein the sorbent material is a moisture-swing material.

9. The system of claim 6, wherein the propulsion system is configured such that, for each panel of the plurality of panels, the collection phase of the circuit comprises the panel moving along the track at a speed such that the sorbent material is capturing atmospheric carbon dioxide throughout the collection phase and is substantially loaded when the panel arrives at the harvest house at the end of the collection phase.

10. The system of claim 6:

wherein each panel of the plurality of panels further comprises a primary dimension, a secondary dimension, and a tertiary dimension, the primary, secondary, and tertiary dimensions being orthogonal to each other;

wherein the primary dimension is at least equal to the secondary dimension and the tertiary dimension is less than both the primary dimension and the secondary dimension; and wherein the at least one aperture of the harvest house has an aperture width that is greater than the tertiary dimension and less than the primary and secondary dimensions, and an aperture height that is greater than the secondary dimension.

11. The system of claim 6, wherein the propulsion system comprises a plurality of engines movably coupled to the track, each engine configured to move a subset of the plurality of panels along the circuit.

12. The system of claim 6, wherein the propulsion system comprises an engine that is stationary with respect to the track, the propulsion system further comprising a haul cable slidably coupled to and tracing the track, the engine and plurality of panels being coupled to the haul cable such that the engine pulls the plurality of panels along the track using the haul cable.

13. The system of claim 6 wherein, for each panel of the plurality of panels, the orientation is mechanically constrained to a predefined range.

14. The system of claim 6, further comprising:

a control system communicatively coupled to the propulsion system;

wherein each panel of the plurality of panels further comprises an actuator communicatively coupled to the control system and configured to modify the orientation of the panel.

15. The system of claim 14, further comprising:

a plurality of environmental sensors communicatively coupled to the control system;

wherein, for each panel of the plurality of panels, the control system modifies the orientation of the panel based on an environmental condition observed by the plurality of sensors and a location of the panel along the track.

16. The system of claim 6, wherein the plurality of panels is releasably coupled to the track, and wherein transitioning from the collection phase to the release phase comprises decoupling from the track.

17. The system of claim 6, wherein the track passes through the harvest house.

18. The system of claim 17 wherein, for each panel of the plurality of panels, transitioning from the collection phase to the release phase comprises the panel becoming slidably coupled to the propulsion system.

\* \* \* \* \*